S., F. & L. H. F. ROHE.
DEVICE FOR EXTRACTING TRACTION WHEELS FROM HOLES.
APPLICATION FILED DEC. 1, 1913.
1,121,869.
Patented Dec. 22, 1914.
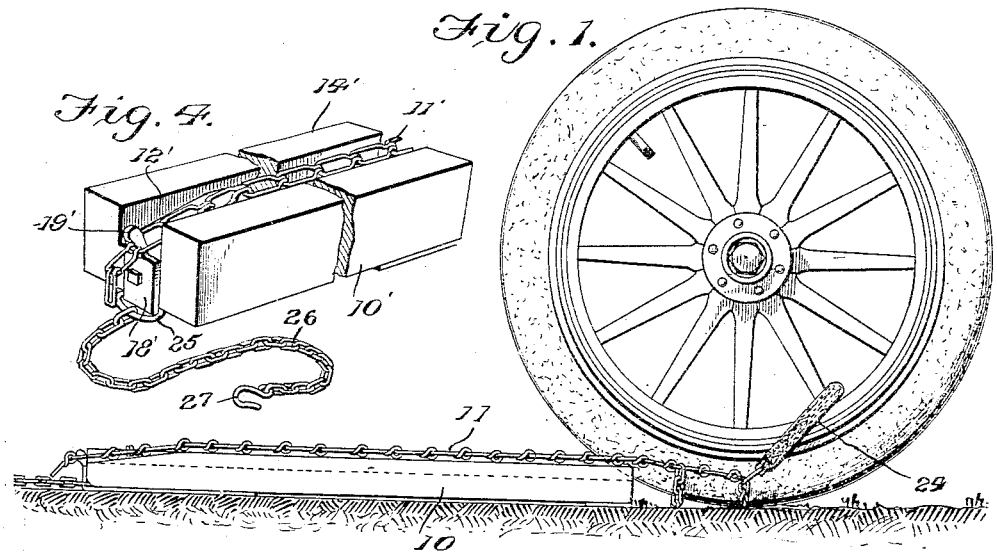
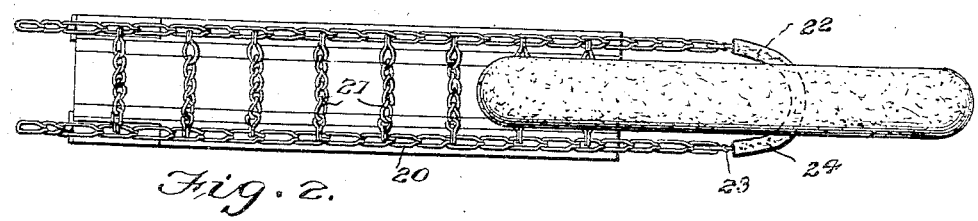
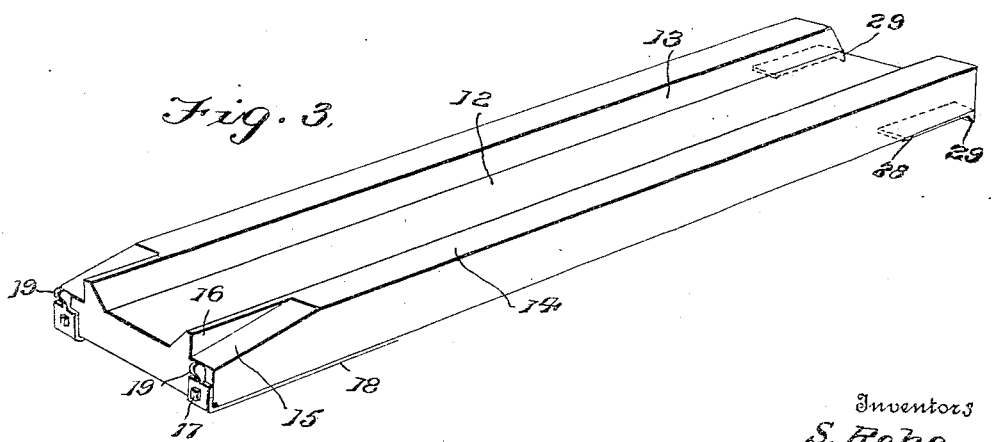
Inventors
S. Rohe,
F. Rohe,
L. H. F. Rohe,
Witnesses
By
Attorneys

UNITED STATES PATENT OFFICE.

SAMUEL ROHE, FOSTMAN ROHE, AND LOUIS H. F. ROHE, OF KENMARE, NORTH DAKOTA.

DEVICE FOR EXTRACTING TRACTION-WHEELS FROM HOLES.

1,121,869.           Specification of Letters Patent.     Patented Dec. 22, 1914.

Application filed December 1, 1913. Serial No. 804,097.

*To all whom it may concern:*

Be it known that we, SAMUEL ROHE, FOSTMAN ROHE, and LOUIS H. F. ROHE, citizens of the United States, residing at Kenmare, in the county of Ward and State of North Dakota, have invented certain new and useful Improvements in Devices for Extracting Traction-Wheels from Holes, of which the following is a specification.

Our invention relates to new and useful improvements in devices for use in connection with drive or tractive wheels for self-propelled vehicles of all types, the same being an improvement over the structure disclosed in a patent previously granted to us and bearing the No. 1,067,940.

The object of our invention is, in general, to provide a device by means of which the wheels may be drawn out of sand, mud holes and the like.

More specifically, the object of our present invention is to provide the body member of the device with a groove or channel which will form a guide for the wheel during the passage of the wheel over the body member or block, thus particularly adapting the device for use in extracting the drive wheels of automobiles.

A further object of our invention is to so arrange the grooved body member or block of the device that it may be employed with the usual form of tire chains, the side chain portions thereof being supported by the block without the necessity of positioning them in any grooves or channels as is the case in our previous construction. And a still further object of our invention is to provide a novel form of hook for securing the chain to the body member or block.

With these and other objects in view, our invention will be more fully described, illustrated in the accompanying drawing, and then specifically pointed out in the claims which are attached to and form a part of this application.

In the drawing: Figure 1 is a side elevation, showing our improved device in operation, all portions of the vehicle, save one of its traction wheels, being omitted; Fig. 2 is a top plan view of the structure shown in Fig. 1; Fig. 3 is a perspective view of the body member of the device, shown in Figs. 1 and 2; Fig. 4 is a fragmentary perspective view of a slightly modified form of construction, particularly adapted for use with metallic tractor wheels, such as those employed on traction engines and other types of heavily built self-propelled machines.

Corresponding and like parts are referred to in the following description and indicated in all the views of the drawing by the same reference characters.

Our invention, as in our previous patent, includes a body portion or block 10, preferably consisting of a strip of wood, a chain or other flexible connection 11 adapted to be detachably secured to one end of the body member by one end and by its opposite end to the wheel to be extracted. More specifically, the body member, which is substantially rectangular in shape, is provided in its upper face with a longitudinally extending groove or channel 12, the side walls 13 of which are inclined outwardly as best shown in Fig. 3. This channel of the block, in effect, provides longitudinally extending spaced ribs or shoulders 14 and the outer portions of these ribs or shoulders, at one end, are cut-away to provide downwardly inclined supporting faces 15 immediately adjacent the end of the channel 12, a portion of the ribs 14 remaining between these faces and the channel as shown at 16.

Secured by bolts 17, or other suitable means, to the lower face of the body member 10, and extending in advance of that end having the inclined faces 15, are L-shaped plates 18, the shorter arms of these plates bearing against the adjacent end of the body member 10. These plates are secured one at either side of the body member in such a manner that their upwardly directed end portions are in alinement with the ribs 14 and said end portions are cut-away to provide outbent hook forming tongues 19 for engagement through the links of a tire chain.

In the use of our improved wheel extractor we preferably employ a tire chain, such a chain being indicated by the numeral 11 and including spaced side chains 20 connected by a plurality of transverse chain portions 21. As best shown in Fig. 2 of the drawing the body portion of the block is so formed that when a tire chain of suitable size for use upon such a wheel as the device is to be employed with, is positioned upon the body member, the side chains 20 will rest upon the ribs 14, while the cross-chains 21 seat in the base of the channel or groove 12 of the body member. Corresponding links adjacent the ends of the side chains 20 are engaged upon the hooks 19 and the opposite end of the tire chain is secured to the wheel by means of an extended end portion 22 of one of the side chains, which end portion, terminates in a snap-hook 23 for engagement with the terminal link of the adjacent end of the side chain. This extended portion of the chain 22 is passed about the rim of the wheel, between spokes as shown in Fig. 1 and the wheel rim is protected by a pad-member 24 through which the chain extension 22 passes. This pad may be formed from a section of hose or a sleeve of leather, or other suitable material may be employed.

A substantially triangular-shaped ring 25 may be secured to the forward end of the block by insertion under one of the hook plates 18 and a chain 26 carried by the ring and terminating at its free end in a hook 27 employed as a means for drawing the block out of the mud, sand or other trap from which the wheel has been extracted. The employment of the chain for this purpose will be readily understood, the chain and its hook being in any suitable manner engaged with one of the vehicle wheels after the wheel has passed from the body member and the vehicle then started ahead to draw the block after it.

One or more plates 28 may be secured to the lower face of the block at its rear end and provided with downwardly directed prongs 29 for engagement in the ground or snow when the device is employed in extracting the wheels from frozen ruts, these prongs serving to prevent slipping of the block during use.

For use with heavy metallic traction wheels of traction engines, steam plows and the like, a slightly modified form of construction such as that shown in Fig. 4 may be employed. With this form of device, the body member 10' is provided in its upper face with a longitudinally extending channel 12' providing spaced ribs or shoulders 14' between which is placed a single chain 11'. One end of the block is provided with an L-shaped plate 18' having a terminal hook 19' corresponding to the hook 19, this plate being positioned to present the hook in alinement with the groove or channel of the block.

It will be noted that in both forms of our device the face of that hook adjacent the block end is rounded in order that the chain may become automatically disengaged from the hook or hooks by the passage of the wheel off the block.

It will of course be understood that we do not wish to in any way limit ourselves to the use of the specific form of hook described or to the specific means for fastening the chain to the wheel as various modifications in construction, may be made at any time desired, without in any way departing from the spirit of our invention.

Having thus described the invention, what is claimed as new is:

1. A device of the character described including a body member provided with a longitudinally extending groove having diverging side faces, a chain adapted to seat in the groove, means carried by one end of the chain for attaching the same to a vehicle wheel, and an upwardly and outwardly curved hook secured to one end of the body member.

2. A device of the character described including a longitudinally grooved body member, an L-shaped plate secured to one end of the body member, one arm of said plate being cut-away and outbent to provide a hook, and a chain having links adapted for selective engagement with the hook and provided at one end with means for attachment to a vehicle wheel.

3. A device of the character described including a body member provided with a longitudinally extending groove having diverging side faces providing spaced ribs, the ribs adjacent one end being cut-away to provide inclined bearing faces, hooks secured to that end of the body adjacent the cut-away ends of the ribs and in alinement with the ribs, a chain member including side chains having links adapted for engagement with the hooks and cross chains connecting the side chains to seat in the groove of the body member, one of the side chains having an extension terminating in a snap-hook, said extension being covered with a protective casing.

4. A device of the character described including a body member provided with a longitudinally extending groove having diverging side faces, a chain adapted to seat in the groove, means carried by the chain for attaching the same to a vehicle wheel, means for detachably securing one end of the block, and a second chain permanently secured to the block at its forward end and terminating in a hook.

In testimony whereof we affix our signatures in presence of two witnesses.

SAMUEL ROHE. [L. S.]
    FOSTMAN ROHE. [L. S.]
    LOUIS H. F. ROHE. [L. S.]

Witnesses:
    J. M. ROHE,
    J. C. OLSEN.